United States Patent
Kliger et al.

(10) Patent No.: US 10,781,773 B2
(45) Date of Patent: Sep. 22, 2020

(54) SOLID ROCKET MOTORS INCLUDING FLIGHT TERMINATION SYSTEMS, AND RELATED MULTI-STAGE SOLID ROCKET MOTOR ASSEMBLIES AND METHODS

(71) Applicant: Northrop Grumman Innovation Systems, Inc., Plymouth, MN (US)

(72) Inventors: Joseph J. Kliger, Deweyville, UT (US); Paul C. Braithwaite, Brigham City, UT (US); Brian C. Liechty, Tremonton, UT (US); Donald B. Patterson, Smithfield, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 794 days.

(21) Appl. No.: 14/932,895

(22) Filed: Nov. 4, 2015

(65) Prior Publication Data
US 2017/0122259 A1    May 4, 2017

(51) Int. Cl.
| F02K 9/92 | (2006.01) |
| B64G 1/52 | (2006.01) |
| F02K 9/76 | (2006.01) |
| F02K 9/38 | (2006.01) |
| F02K 9/08 | (2006.01) |
| F02K 9/26 | (2006.01) |
| F02K 9/10 | (2006.01) |

(52) U.S. Cl.
CPC .................. *F02K 9/92* (2013.01); *B64G 1/52* (2013.01); *F02K 9/08* (2013.01); *F02K 9/10* (2013.01); *F02K 9/26* (2013.01); *F02K 9/38* (2013.01); *F02K 9/763* (2013.01)

(58) Field of Classification Search
CPC ..... F02K 9/08; F02K 9/10; F02K 9/26; F02K 9/38; F02K 9/763; F02K 9/92; B64G 1/52

See application file for complete search history.

(56) References Cited

U.S. PATENT DOCUMENTS

| 3,238,872 | A | * | 3/1966 | Louis | ..................... E21B 43/117 |
| | | | | | 102/306 |
| 4,494,373 | A | * | 1/1985 | Vetter | ....................... F02K 9/38 |
| | | | | | 102/481 |
| H001082 | H | * | 8/1992 | Andrew | .......................... 60/253 |
| 5,206,455 | A | * | 4/1993 | Williams | ................ F42B 3/113 |
| | | | | | 102/201 |

(Continued)

OTHER PUBLICATIONS

Ensign-Bickford Aerospace & Defense Company, Linear Shaped Charge (LSC).*

(Continued)

*Primary Examiner* — Todd E Manahan
*Assistant Examiner* — Kyle Robert Thomas
(74) *Attorney, Agent, or Firm* — TraskBritt

(57) ABSTRACT

A solid rocket motor comprises a pressure vessel, a solid propellant structure within the pressure vessel, and a flight termination system overlying the pressure vessel. The flight termination system comprises a shaped charge configured and positioned to effectuate ignition of an inner portion of the solid propellant structure and a reduction in an ability of the pressure vessel to withstand a change in internal pressure. Another solid rocket motor, a multi-stage rocket motor assembly, and a method of destroying a launch vehicle in flight are also described.

24 Claims, 5 Drawing Sheets

(56) References Cited

U.S. PATENT DOCUMENTS

| | | | | |
|---|---|---|---|---|
| 5,206,989 A | * | 5/1993 | Smith | F02K 9/28 29/447 |
| 5,507,231 A | * | 4/1996 | Moore | B64G 1/002 102/374 |
| 6,952,995 B2 | * | 10/2005 | Friedlander, III | F02K 9/38 102/378 |
| 2007/0240600 A1 | * | 10/2007 | Skinner | F42B 39/20 102/481 |
| 2009/0205313 A1 | * | 8/2009 | Cavalleri | F02K 9/18 60/255 |

OTHER PUBLICATIONS

Vigil G.; Manuel, Precision Linear Shaped Charge Analyses for Severance of Metals, Aug. 1996, Sandia Report, SAND96-2031, pp. 1-2 and 25.*

Thakre et al., Solid Propellants, Rocket Propulsion, vol. 2, Encyclopedia of Aerospace Engineering, John Wiley & Sons, Ltd. 2010, 10 pages.

* cited by examiner

SOLID ROCKET MOTORS INCLUDING FLIGHT TERMINATION SYSTEMS, AND RELATED MULTI-STAGE SOLID ROCKET MOTOR ASSEMBLIES AND METHODS

TECHNICAL FIELD

Embodiments of the disclosure relate generally to solid rocket motor design and fabrication. More particularly, embodiments of the disclosure relate to solid rocket motors including flight termination systems, to related multi-stage rocket motor assemblies, and to related methods of destroying a launch vehicle in flight.

BACKGROUND

A solid rocket motor generally includes a pressure vessel (e.g., housing), a solid propellant structure (e.g., grain) within the pressure vessel, and at least one nozzle assembly operatively associated with the pressure vessel and the solid propellant structure. In use and operation, the solid propellant structure is ignited (e.g., by an electric or pyrotechnic igniting device), and as it burns it generates combustion products (e.g., exhaust gases) that are expelled through a thrust nozzle of the nozzle assembly as to provide a thrusting force to propel the solid rocket motor. A multi-stage rocket motor assembly may include a plurality of such solid rocket motors, generally referred to as a plurality of stages, in a stacked arrangement within an outer housing. The outer housing may be separable such that when the solid propellant structure of a given stage has been consumed, the stage may be separated from the other stages to remove excess weight and, hence, increase the range and/or the speed of the multi-stage rocket motor assembly. An adjoining stage may then be fired at a desired later time during the flight of the multi-stage rocket motor assembly.

A solid rocket motor can also include a flight termination system. The flight termination system may be configured to prematurely end the flight of an launch vehicle (e.g., rocket, missile, etc.) including the solid rocket motor to mitigate problems (e.g., undesired trajectory changes) associated therewith. When flight termination may occur near a populated area (e.g., a city, a town, etc.), the flight termination system must generally be configured to mitigate overpressure (e.g., near-field blast overpressure, distance focused overpressure) produced as the solid propellant of the solid rocket motor impacts the ground. One method of mitigating produced overpressure is to break the solid propellant structure of the solid rocket motor into multiple pieces prior to ground impact. Relatively smaller pieces of solid propellant impacting the ground produce less blast than a single piece of solid propellant having the same total weight.

Some conventional flight termination systems utilize shaped charges to cut though the pressure vessel of a solid rocket motor and terminate thrust. Such flight termination systems can make a pressurized solid rocket motor non-propulsive, and can break the solid propellant structure of the pressurized solid rocket motor into relatively smaller pieces. Unfortunately, such flight termination systems do not adequately break up the propellant structures of unpressurized solid rocket motors (e.g., unpressurized stages of a multi-stage rocket motor assembly) into relatively smaller pieces. Additional conventional flight termination systems utilize multiple shaped charges each configured to cut completely through the pressure vessel and the solid propellant structure of a solid rocket motor. Unfortunately, such flight termination systems can be very complicated and can incur undesirable weight penalties and system costs due to the amounts and/or strengths of shaped charges required. Further conventional flight termination systems utilize shaped charges configured and positioned to pulverize the solid propellant structure of the solid rocket motor. Unfortunately, such flight termination systems can also be very complicated, can be undesirably energetic as a result of the high pressures and energy release effectuated during the pulverization process, and can be insufficient and/or prohibitively expensive to destroy to the solid propellant structures of relatively larger (e.g., longer) solid rocket motors.

It would, therefore, be desirable to have solid rocket motors and multi-stage rocket motor assemblies including new flight termination systems that alleviate one or more of the above problems associated with conventional flight termination systems. In addition, it would be desirable if the flight termination systems and components thereof were relatively easy to fabricate and could be readily tailored to a variety of different solid rocket motor and multi-stage rocket motor assembly configurations.

BRIEF SUMMARY

In some embodiments, a solid rocket motor comprises a pressure vessel, a solid propellant structure within the pressure vessel, and a flight termination system overlying the pressure vessel. The flight termination system comprises a shaped charge configured and positioned to effectuate ignition of an inner portion of the solid propellant structure and a reduction in an ability of the pressure vessel to withstand increases in internal pressure.

In additional embodiments, a solid rocket motor comprises a pressure vessel, a solid propellant structure within the pressure vessel, and a flight termination system overlying the pressure vessel. The flight termination system comprises at least one first shaped charge and at least one second shaped charge spaced apart from the at least one first shaped charge. The at least one first shaped charge is configured and positioned to effectuate ignition of an inner portion of the solid propellant structure. The at least one second shaped charge is configured and positioned to effectuate a reduction in an ability of the pressure vessel to withstand a change in internal pressure.

In further embodiments, a multi-stage rocket motor assembly comprises an outer housing and a plurality of stages in a stacked arrangement within the outer housing. At least one stage of the plurality of stages comprises a pressure vessel, a solid propellant structure within the pressure vessel, and a flight termination system overlying the pressure vessel. The flight termination system comprises at least one shaped charge configured and positioned to effectuate ignition of an inner portion of the solid propellant structure and a reduction in an ability of the pressure vessel to withstand a change in internal pressure.

In further embodiments, a method of destroying a launch vehicle in flight comprises initiating at least one shaped charge of a flight termination system of a solid rocket motor of the launch vehicle to pressurize the solid rocket motor and weaken a pressure vessel thereof to fragment a solid propellant structure of the solid rocket motor.

DETAILED DESCRIPTION

Figure 1A:
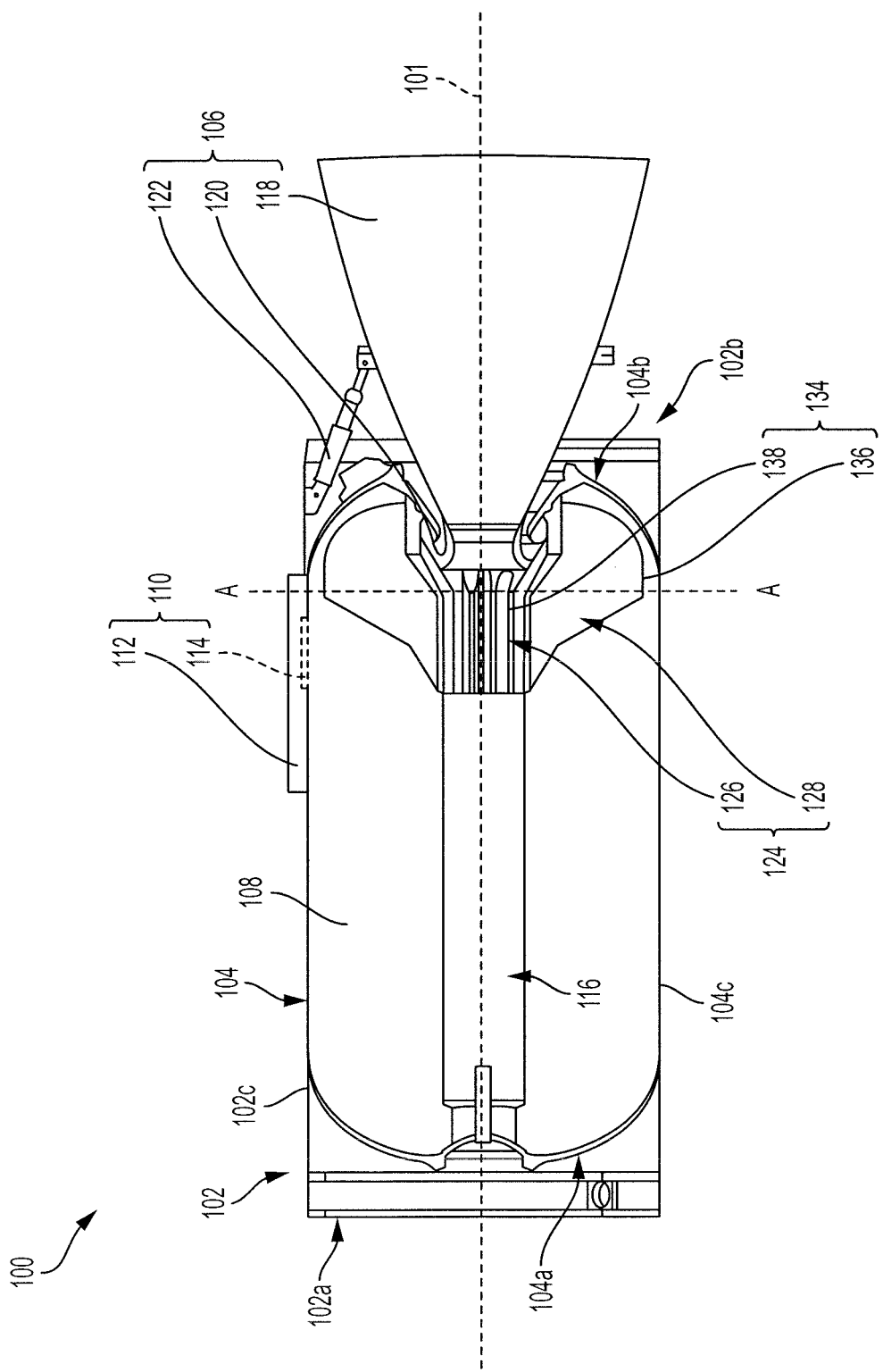
FIGS. 1A and 1B are longitudinal, cross-sectional (FIG. 1A) and lateral, cross-sectional (FIG. 1B) views of a solid rocket motor including a flight termination system, in accordance with embodiments of the disclosure.

Solid rocket motors including flight termination systems are disclosed, as are multi-stage rocket motor assemblies, and methods of destroying a launch vehicle in flight. In some embodiments, a solid rocket motor includes a pressure vessel, a solid propellant structure within the pressure vessel, and a flight termination system overlying the pressure vessel. The flight termination system includes at least one shaped charge configured and positioned to produce at least one cutting jet effective to ignite and pressurize the solid rocket motor and also effective to reduce the ability of the solid rocket motor to withstand a change (e.g., increase) in internal pressure. The at least one cutting jet may penetrate (e.g., cut) through portions of the pressure vessel and the solid propellant structure overlying a radial end of an opening (e.g., groove, slot, fin slot, etc.) within the solid propellant structure to ignite an inner portion of the solid propellant structure proximate the opening and may also damage (e.g., at least partially penetrate through) additional portions of at least the pressure vessel not overlying the radial end of the opening to weaken the pressure vessel. Optionally, the flight termination system may also include at least one conditioning structure configured and positioned to at least partially protect one or more portions of at least the pressure vessel from the cutting jet. The flight termination system may facilitate the reliable fragmentation of the solid propellant structure into smaller pieces that produce significantly less overpressure (e.g., near-field blast overpressure and/or distance focused overpressure) upon impact with the ground. A multi-stage rocket motor assembly may include a plurality of stages in a stacked arrangement within an outer housing, wherein at least one of the stages exhibits a configuration substantially similar to the aforementioned solid rocket motor. The solid rocket motors, multi-stage rocket motor assemblies, and methods of the disclosure may provide increased safety (e.g., less produced overpressure, increased destruction reliability, etc.), reduced costs (e.g., reduced ordnance costs, reduced manufacturing costs, etc.), increased destruction efficiency, and increased payloads as compared to conventional solid rocket motors, conventional rocket motor assemblies, and conventional methods. The solid rocket motors, multi-stage rocket motor assemblies, and methods of the disclosure may also enable aerospace operations in areas (e.g., populated areas) too sensitive for conventional solid rocket motors, conventional multi-stage rocket motor assemblies, and conventional methods.

The following description provides specific details, such as sizes, shapes, material compositions, and orientations in order to provide a thorough description of embodiments of the disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a flight termination system, solid rocket motor, or multi-stage solid rock motor assembly. Only those process acts and structures necessary to understand the embodiments of the disclosure are described in detail below. Additional acts to form a complete flight termination system, solid rocket motor, or multi-stage rocket motor assembly from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the terms "longitudinal," "vertical," "lateral," and "horizontal" and are in reference to a major plane of a substrate (e.g., base material, base structure, base construction, etc.) in or on which one or more structures and/or features are formed and are not necessarily defined by earth's gravitational field. A "lateral" or "horizontal" direction is a direction that is substantially parallel to the major plane of the substrate, while a "longitudinal" or "vertical" direction is a direction that is substantially perpendicular to the major plane of the substrate. The major plane of the substrate is defined by a surface of the substrate having a relatively large area compared to other surfaces of the substrate.

As used herein, spatially relative terms, such as "beneath," "below," "lower," "bottom," "above," "over," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the terms "configured" and "configuration" refer to a size, shape, material composition, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Figure 1B:
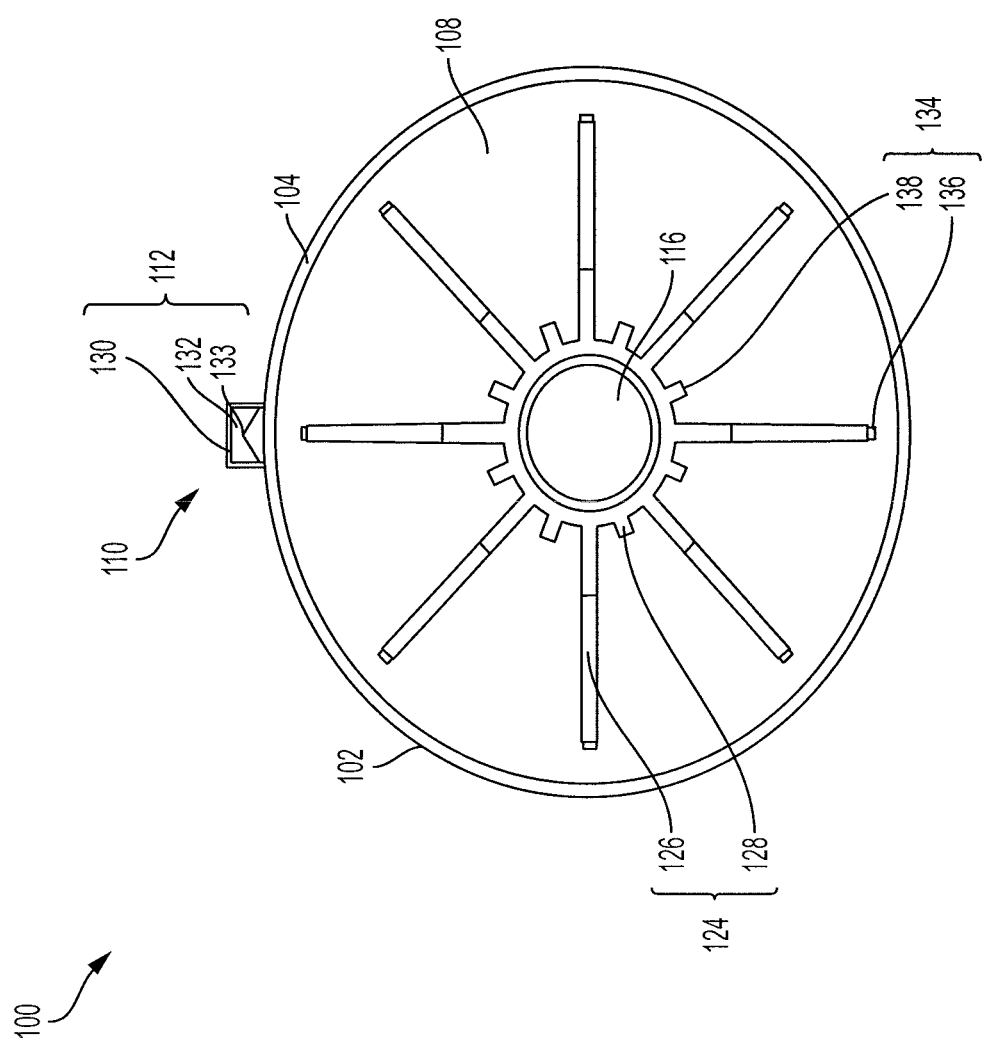

FIG. 1A is a longitudinal, cross-sectional view of a solid rocket motor 100 for use in accordance with an embodiment of the disclosure. The solid rocket motor 100 may, for example, be configured to be a component (e.g., stage) of a larger assembly (e.g., a multi-stage rocket motor assembly), as described in further detail below. As shown in FIG. 1A, the solid rocket motor 100 may include a skirt 102, a pressure vessel 104 disposed within the skirt 102, a solid propellant structure 108 disposed within the pressure vessel 104, a nozzle assembly 106 connected to an aft end 104b of the pressure vessel 104, and a flight termination system 110 on or over the pressure vessel 104 (e.g., on or over the skirt 102, on each of the pressure vessel 104 and the skirt 102, etc.). The flight termination system 110 may include at least one shaped charge 112 configured and positioned to produce at least one cutting jet that damages (e.g., at least partially cuts through) the one or more portions of the pressure vessel 104 and that penetrates through one or more portions of the solid propellant structure 108 to ignite an inner portion of the solid propellant structure 108, as described in further detail below. By way of non-limiting example, the cutting jet produced by the shaped charge 112 may damage at least one portion of the pressure vessel 104 and may also penetrate through at least one portion of the solid propellant structure 108 proximate at least one slot 124 within the solid propellant structure 108 to ignite at least an inner portion of the solid propellant structure 108 adjacent a bore 116 in communication with the slot 124. Optionally, the flight termination system 110 may also include at least one conditioning structure 114 disposed between (e.g., intervening between) at least one portion of the shaped charge 112 and at least one underlying portion of the pressure vessel 104. The solid rocket motor 100 may also include various other structures and/or devices (e.g., insulation structures, ignitor assemblies, etc.) known in the solid rocket motor art. FIG. 1B is a lateral, cross-sectional view of the solid rocket motor 100 from the position identified by the dashed line A-A in FIG. 1A.

The skirt 102 may comprise a structure configured to contain (e.g., house, hold, etc.) the pressure vessel 104. For example, as shown in FIG. 1A, the skirt 102 may comprise a substantially hollow and elongated structure including a fore end 102a, an aft end 102b, and a generally tubular sidewall 102c extending between the fore end 102a and the aft end 102b. The fore end 102a may, for example, be configured for transfer of thrust loads and for mating to processing tooling, while aft end 102b may, for example, be configured to support at least one actuator 122 of the nozzle assembly 106 and to mate to other processing tooling. Suitable configurations (e.g., components, component shapes, component sizes, component materials, component arrangements, etc.) for the skirt 102 are well known in the solid rocket motor art and, therefore, are not described in detail herein. In some embodiments, the skirt 102 is about twelve (12) feet in diameter and about twenty-three and one-half (23.5) feet in length.

The pressure vessel 104 may comprise a structure configured to contain (e.g., house, hold, etc.) the solid propellant structure 108. For example, as shown in FIG. 1A, the pressure vessel 104 may comprise a substantially hollow and elongated structure including a dome-shaped aft end 104b from which a first end of the solid propellant structure 108 may be ignited, a dome-shaped fore end 104a opposing the dome-shaped aft end 104b, and a tubular sidewall 104c extending between the dome-shaped aft end 104b and the dome-shaped fore end 104a. The pressure vessel 104 may be formed of and include one or more of a metal (e.g., titanium), a metal alloy (e.g., a steel alloy), a ceramic material, and a composite material (e.g., a graphite epoxy). Suitable configurations (e.g., components, component shapes, component sizes, component materials, component arrangements, etc.) for the pressure vessel 104 are well known in the solid rocket motor art and, therefore, are not described in detail herein. In some embodiments, the pressure vessel 104 exhibits a generally tubular, dome ended shape having a wall thickness within a range of from about one (1) inch to about two (2) inches, is formed of and includes a graphite epoxy, and has a maximum expected operating pressure (MEOP) of about 2000 pounds per square inch (psi).

The solid propellant structure 108 may be formed of and include at least one solid propellant. Various examples of suitable solid propellants and components thereof are described in Thakre et al., *Solid Propellants*, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4 or 1.3 material, as defined by the United States Department of Transportation shipping classification, so that transportation restrictions are minimized. By way of non-limiting example, the solid propellant of the solid propellant structure 108 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), nitrocellulose (NC), glycidyl azide (GAP), diethyleneglycol triethyleneglycol nitraminodiacetic acid terpolymer (9DT-NIDA), bis(azidomethyl)-oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated poly-ether (HTPE), carboxyl-terminated polybutadiene (CTPB) and carboxyl-terminated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HMX), cyclotrimethylene trinitramine (RDX), 2,4,6,8,10, 12-hexanitro-2,4,6,8,10,12-hexaazaisowurtzitane (CL-20 or HNIW), and/or 4,10-dinitro-2,6,8,12-tetraoxa-4,10-diazatetracyclo-[$5.5.0.0^{5,9}.0^{3,11}$]-dodecane (TEX). In addition, the solid propellant of the solid propellant structure 108 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the solid rocket motor art and, therefore, are not described in detail herein. The components of the solid propellant of the solid propellant structure 108 may be combined by conventional techniques, which are not described in detail herein. In some embodiments, the solid propellant structure 108 is formed of and includes greater than or equal to about 200,000 pounds of class 1.3 solid propellant.

As shown in FIGS. 1A and 1B, the solid rocket motor 100 may include at least one bore 116 disposed within the solid propellant structure 108. The configuration (e.g., shape, size, position, orientation, etc.) of the bore 116 may be selected to control the ballistic (e.g., thrust versus time) performance of the solid rocket motor 100 (e.g., by controlling the surface area of the solid propellant structure 108 exposed to ignition and combustion). Suitable configurations for the bore 116 are well known in the solid rocket motor art and, therefore, are not described in detail herein. As a non-limiting example, the bore 116 may be centrally positioned within the solid propellant structure 108 (e.g., about a central longitudinal axis 101 of the solid rocket motor 100), and may at least partially (e.g., substantially) longitudinally extend through the solid propellant structure 108. In some embodiments, the bore 116 extends an entire length of the solid propellant structure 108. In additional embodiments, the bore 116 extends less an entire length of the solid propellant structure 108. In further embodiments, the bore 116 may be absent (e.g., omitted) from the solid propellant structure 108.

As also shown in FIGS. 1A and 1B, the solid rocket motor 100 may include slots 124 (e.g., fin slots) disposed within the solid propellant structure 108. The configurations (e.g., shapes, sizes, positions, orientations, numbers, etc.) of the slots 124 may be selected to control the ballistic performance of the solid rocket motor 100. Suitable configurations for the slots 124 are well known in the solid rocket motor art and, therefore, are not described in detail herein. As a non-limiting example, the slots 124 may be positioned at an end (e.g., an aft end, a fore end, etc.) of the solid propellant structure 108 and may extend radially outward from the bore 116 to radial ends 134 (e.g., fin valleys) in a radiosymmetric pattern. The slots 124 may include major slots 126 and an equal number of interposed minor slots 128. The major slots 126 may radially extend from the bore 116 to major radial ends 136, and the minor slots 128 may radially extend from the bore 116 to minor radial ends 138. The major radial ends 136 of the major slots 126 may be positioned more proximate to the pressure vessel 104 than the minor radial ends 138 of the minor slots 128. At least a portion of the major radial ends 136 of the major slots 126 may be positioned proximate the tubular sidewall 104c of the pressure vessel 104. In some embodiments, a thickness of a portion of the solid propellant structure 108 intervening between the pressure vessel 104 and the bore 116 is about fifty-four (54) inches, and a thickness of other portions of the solid propellant structure 108 intervening between the pressure vessel 104 and the major radial ends 136 of the major slots 126 is about six (6) inches. In additional embodiments, the solid rocket motor 100 may exhibit a different slot configuration (e.g., a different fin slot configuration) within the solid propellant structure 108. For example, the solid rocket motor 100 may exhibit one or more of a different shape, a different size, a different position, a different orientation, and a different quantity of one or more of the slots 124. In further embodiments, the solid rocket motor 100 may be substantially free of slots (e.g., fin slots) within the solid propellant structure 108 (e.g., the slots 124 may be absent from the solid propellant structure 108).

Referring to FIG. 1A, the nozzle assembly 106 may be cooperatively associated with the skirt 102, the pressure vessel 104, and the solid propellant structure 108 so as to produce a desired thrust. The nozzle assembly 106 may be stationary (e.g., fixed), or may be adjustable to selectively alter the course of flight of the solid rocket motor 100 (and, hence, of a launch vehicle including the solid rocket motor 100). For example, as shown in FIG. 1A, in some embodiments, the nozzle assembly 106 includes thrust nozzle 118, a flexible bearing assembly 120 connected to the thrust nozzle 118 and the pressure vessel 104, and at least one actuator 122 connected to the skirt 102 and the thrust nozzle 118. Lateral movement of the flexible bearing assembly 120 by way of the actuator 122 may be used to modify the position of the thrust nozzle 118 so as to control the direction of the solid rocket motor 100 (and, hence, of a launch vehicle including the solid rocket motor 100) during use and operation (e.g., flight) thereof. Suitable configurations (e.g., components, component shapes, component sizes, component materials, component arrangements, etc.) for the nozzle assembly 106 are well known in the solid rocket motor art and, therefore, are not described in detail herein.

The flight termination system 110 may be configured and positioned to ignite and pressurize the solid rocket motor 100 while also reducing the ability of the solid rocket motor 100 to withstand a change (e.g., increase) in internal pressure. For example, the flight termination system 110 may be configured and positioned to ignite at least an inner portion of the solid propellant structure 108 (e.g., at least a portion of the solid propellant structure 108 radially adjacent to and/or exposed by one or more of the bore 116 and the slots 124) so as to pressurize the solid rocket motor 100, and may also be configured and operated to cut at least partially through one or more portions of the pressure vessel 104 to weaken the pressure vessel 104. Pressurizing the solid rocket motor 100 while also damaging the pressure vessel 104 thereof may cause the pressure vessel 104 to fail prior to reaching to a standard ignition pressure of the solid rocket motor 100. The failed pressure vessel 104 may be unable to support the ignited solid propellant structure 108, causing the failed pressure vessel 104 and the ignited solid propellant structure 108 to break into smaller pieces presenting substantially reduced safety concerns (e.g., reduced earthen-impact-based overpressure concerns, such near-field blast overpressure concerns and distance focused overpressure concerns). The flight termination system 110 advantageously utilizes energy produced by the solid propellant structure 108 upon the ignition thereof to assist with the destruction of the solid rocket motor 100. Utilizing the energy produced by the solid propellant structure 108 may reduce the amount of ordnance (e.g., shaped charges) required to safely break up the solid rocket motor 100 using the flight termination system 110 as compared to conventional flight termination systems that only utilize the energy produced by the ordnance (e.g., shaped charges) thereof to break up a conventional solid rocket motor.

The shaped charge 112 of the flight termination system 110 may comprise at least one linear shaped charge configured and positioned to effectuate the ignition of an inner portion of the solid propellant structure 108 and to also effectuate catastrophic damage to the pressure vessel 104. As shown in FIG. 1B, the shaped charge 112 may include a casing 130, an explosive material 132 within the casing 130, and a concave (e.g., V-shaped) liner 133 within the casing 130 and backed by the explosive material 132. As described in further detail below, the properties (e.g., size, material composition, strength, and orientation, relative arrangement, etc.) of the shaped charge 112 may be selected (e.g., tailored) relative to the configurations (e.g., shapes, sizes, material compositions, arrangements, etc.) of the other components (e.g., the skirt 102; the pressure vessel 104; the solid propellant structure 108; the slots 124 within the solid propellant structure 108; the bore 116 extending through the solid propellant structure 108; the conditioning structure 114, if any; etc.) to ensure desired destruction of the solid rocket motor 100 using the flight termination system 110.

The shaped charge 112 may be positioned at one or more locations on or over the pressure vessel 104 (e.g., on or over the skirt 102) of the solid rocket motor 100 permitting a cutting jet produced upon detonation of the explosive material 132 to cut through underlying portions of the pressure vessel 104 and the solid propellant structure 108 and ignite an inner portion of solid propellant structure 108. The position of the shaped charge 112 may be selected at least partially based on the configurations and positions of the other components of the solid rocket motor 100. At least a portion of the shaped charge 112 may be positioned over a portion of the solid propellant structure 108 at a location exhibiting a relatively smaller radial thickness of solid propellant so as to minimize the amount of solid propellant the cutting jet subsequently produced by the shaped charge 112 has to cut through to access the bore 116 and ignite the solid propellant structure 108. By way of non-limiting example, as shown in FIGS. 1A and 1B, in embodiments wherein the radial ends 134 of one or more of the slots 124 (e.g., the major radial ends 136 of the major slots 126) within the solid propellant structure 108 are positioned proximate the tubular sidewall 104c of the pressure vessel 104, a portion of the shaped charge 112 may be positioned over one or more of the radial ends 134 of the slots 124 (e.g., over one or more of the major radial ends 136 of the major slots 126) such that a cutting jet subsequently produced by the shaped charge 112 cuts through the solid propellant intervening between the pressure vessel 104 and the radial ends 134 of the slots 124 (e.g., rather than the solid propellant intervening between the pressure vessel 104 and the bore 116) to gain access to and ignite the solid propellant structure 108 at the bore 116.

The shaped charge 112 may extend in one or more of a substantially linear path and substantially non-linear path (e.g., a curved path, an angled path, a jagged path, a sinusoidal path, a V-shaped path, an U-shaped path, an irregularly shaped path, combinations thereof, etc.) over the pressure vessel 104. The pathing of the shaped charge 112 may be selected at least partially based on the configurations and positions of the other components of the solid rocket motor 100. In some embodiments, the shaped charge 112 extends in a substantially linear path over at least the tubular sidewall 104c of the pressure vessel 104. In additional embodiments, the shaped charge 112 extends in a substantially non-linear path over at least the tubular sidewall 104c of the pressure vessel 104.

The shaped charge 112 may be provided in any orientation relative to the central longitudinal axis 101 of the solid rocket motor 100 permitting the shaped charge 112 to ignite an inner portion of the solid propellant structure 108 and to sufficiently damage the pressure vessel 104 to facilitate desired breakup of the solid rocket motor 100. The orientation of the shaped charge 112 may be selected at least partially based on the configurations and positions of the other components of the solid rocket motor 100. In some embodiments, the shaped charge 112 is oriented substantially to parallel to the central longitudinal axis 101 of the solid rocket motor 100. For example, as shown in FIGS. 1A and 1B, the shaped charge 112 may be oriented parallel to the central longitudinal axis 101, and may be laterally aligned with and at least partially positioned over one or more of the major radial ends 136 of the major slots 126 within the solid propellant structure 108. In additional embodiments, the shaped charge 112 is oriented non-parallel (e.g., perpendicular, diagonal, etc.) to the central longitudinal axis 101 of the solid rocket motor 100. For example, the shaped charge 112 may be partially positioned over one or more of the major radial ends 136 of the major slots 126 in the solid propellant structure 108, but the shaped charge 112 may be oriented non-parallel to the central longitudinal axis 101 of the solid rocket motor 100.

The shaped charge 112 may exhibit any dimensions (e.g., length, width, height) and cutting strength (e.g., detonation rate and explosive load) permitting the shaped charge 112 to ignite an inner portion of the solid propellant structure 108 and to sufficiently damage the pressure vessel 104 so as to facilitate desired breakup of the solid rocket motor 100. The dimensions and the cutting strength of the shaped charge 112 may be selected at least partially based on the configurations and positions of the other components of the solid rocket motor 100. As a non-limiting example, the shaped charge 112 may exhibit a length less than or equal to about seventy-five (75) percent (e.g., less than or equal to about fifty (50) percent, less than or equal to about twenty-five (25) percent, less than or equal to about fifteen (15) percent, less than or equal to about ten (10) percent, less than or equal to about five (5) percent, etc.) of the length of the skirt 102, a detonation rate greater than or equal to about 6,500 meters per second (m/s) (e.g., greater than or equal to about 7,000 m/s, greater than or equal to about 7,500 m/s, greater than or equal to about 8,000 m/s, greater than or equal to about 8,500 m/s, greater than or equal to about 9,000 m/s, etc.), and an explosive load greater than or equal to about 400 grains per foot (grains/ft) (e.g., greater than or equal to about 600 grains/ft, greater than or equal to about 1,200 grains/ft, greater than or equal to about 2,000 grains/ft, greater than or equal to about 3,200 grains/ft, greater than or equal to about 4,000 grains/ft, etc.). In some embodiments, the shaped charge 112 has a length about five (5) ft, a detonation rate greater than or equal to about 8,200 m/s, and an explosive load of about 2,000 grains/ft.

While FIGS. 1A and 1B depict the flight termination system 110 as being formed of and including a single shaped charge 112 (i.e., only one shaped charge 112), the flight termination system 110 may, alternatively, be formed of and include a plurality of shaped charges 112 (i.e., multiple shaped charges 112). The flight termination system 110 may include any quantity and any distribution of shaped charges 112 facilitating the ignition of an inner portion of the solid propellant structure 108 and also facilitating sufficient to damage the pressure vessel 104 for desired breakup of the solid rocket motor 100. The quantity, size, configuration, arrangement, orientation and distribution of the shaped charge(s) 112 may be selected at least partially based on the configurations and positions of the other components of the solid rocket motor 100. The flight termination system 110 may, for example, employ multiple shaped charges 112 to provide redundant means of igniting the solid propellant structure 108 and/or to increase one or more of the amount and the distribution of damage to the pressure vessel 104. If the flight termination system 110 includes a plurality of the shaped charges 112, the shaped charges 112 may be symmetrically distributed over the pressure vessel 104 of the solid rocket motor 100, or may be asymmetrically distributed over the pressure vessel 104 of the solid rocket motor 100. In addition, if the flight termination system 110 includes a plurality of the shaped charges 112, each of the shaped charges 112 may be substantially the same (e.g., exhibit substantially the same size, shape, material composition, and orientation), or at least one of the shaped charges may be different than (e.g., exhibit one or more of a different size, a different shape, a different material composition, and a different orientation) than at least one other of the shaped charges 112.

Referring to again to FIG. 1A, if present, the conditioning structure 114 of the flight termination system 110 may comprise at least one structure configured and positioned to limit damage to at least the pressure vessel 104 caused by the initiation of the shaped charge 112 of the flight termination system 110. As a non-limiting example, the conditioning structure 114 may comprise at least one structure configured and positioned to partially intervene between the shaped charge 112 and the pressure vessel 104 to reduce or even prevent penetration of a cutting jet subsequently produced by the shaped charge 112 into one or more portions of the pressure vessel 104 covered by the shaped charge 112. The conditioning structure 114 may be formed of and include one or more materials (e.g., a metal, a metal alloy, a ceramic, a ceramic-metal composite, combinations thereof, etc.) able to at least partially (e.g., substantially) absorb the energy of the subsequently produced cutting jet to protect the portion(s) of the pressure vessel 104 covered thereby. As another non-limiting example, the conditioning structure 114 may comprise at least one structure configured and positioned to prevent the shaped charge 112 from subsequently producing a cutting jet over one or more portions of the pressure vessel 104 covered by the shaped charge 112. The conditioning structure 114 may, for example, comprise at least one material (e.g., an adhesive, a metal, a metal alloy, a ceramic, a ceramic-metal composite, combinations thereof, etc.) positioned directly adjacent an apex of the concave liner 133 (FIG. 1B) of one or more portions of the shaped charge 112 so as to prevent the subsequent production of the cutting jet at the one or more portions of the shaped charge 112. The conditioning structure 114, if present, may permit a cutting jet produced by the shaped charge 112 to cut through a portion of solid propellant structure 108 and ignite an inner portion of the solid propellant structure 108 while also limiting the amount of the pressure vessel 104 and the solid propellant structure 108 cut using the shaped charge 112. Limiting the amount of the pressure vessel 104 and the solid propellant structure 108 cut using the shaped charge 112 may control (e.g., limit) venting of the solid rocket motor 100 upon the ignition and combustion of the solid propellant structure 108 to ensure that the solid rocket motor 100 becomes sufficiently pressurized to facilitate desired breakup of the solid propellant structure 108 and the pressure vessel 104.

Figure 2A:
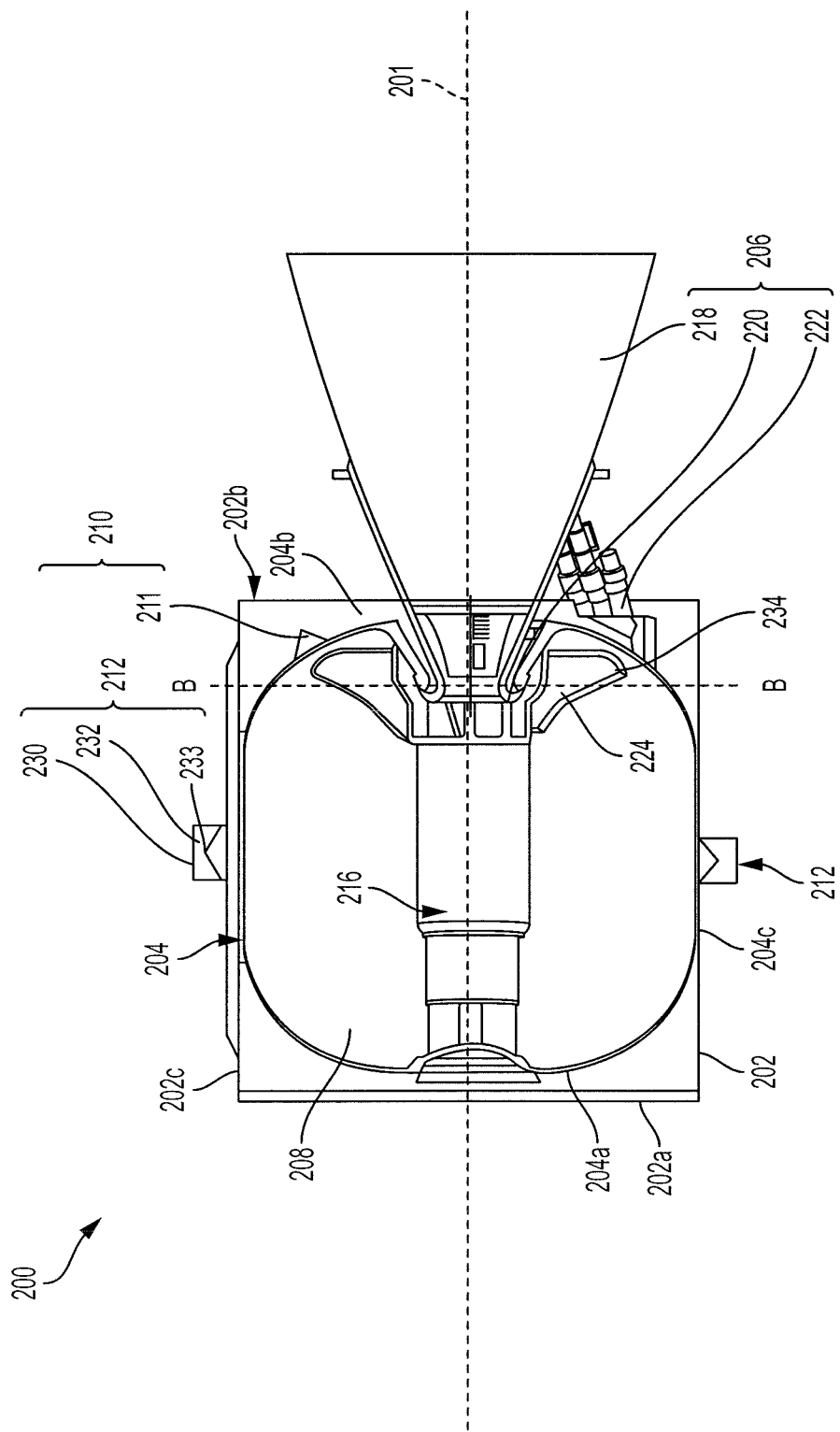
FIGS. 2A and 2B are longitudinal, cross-sectional (FIG. 2A) and lateral, cross-sectional (FIG. 2B) views of a solid rocket motor including a flight termination system, in accordance with additional embodiments of the disclosure.
Figure 2B:
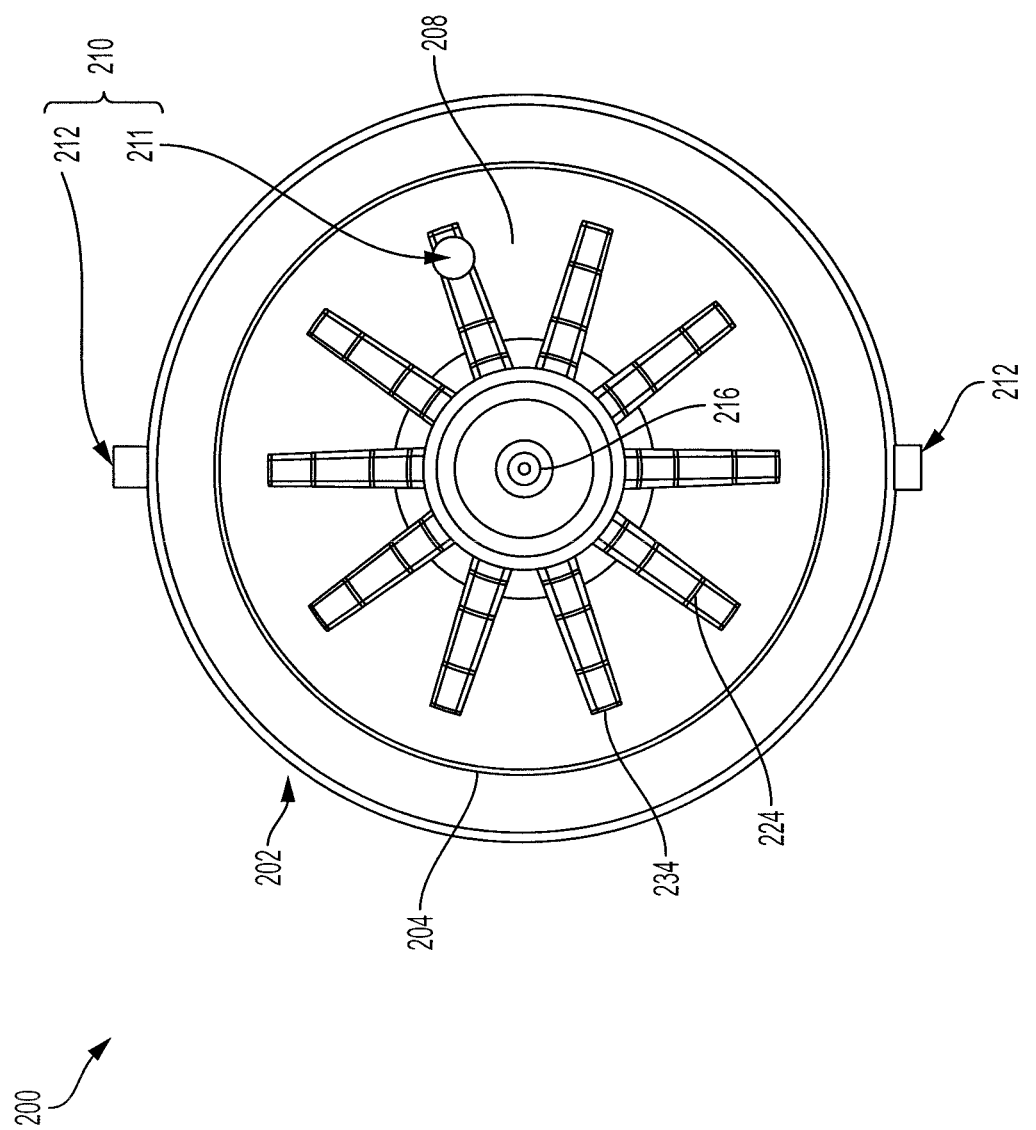

While FIGS. 1A and 1B depict a particular configuration of the solid rocket motor 100 (including a particular configuration of the flight termination system 110 thereof), different configurations may be employed. By way of non-limiting example, in accordance with additional embodiments of the disclosure, FIG. 2A shows a longitudinal, cross-sectional view of a solid rocket motor 200 exhibiting an alternative configuration. FIG. 2B is a lateral, cross-sectional view of the solid rocket motor 200 from the position identified by the dashed line B-B in FIG. 2A. Throughout the remaining description and the accompanying figures, functionally similar features are referred to with similar reference numerals incremented by 100. To avoid repetition, not all features shown in FIGS. 2A and 2B are described in detail herein. Rather, unless described otherwise below, features designated by a reference numeral that is a 100 increment of the reference numeral of a feature described previously will be understood to be substantially similar to the feature described previously.

The solid rocket motor 200 may include a skirt 202, a pressure vessel 204 disposed within the skirt 202, a solid propellant structure 208 disposed within the pressure vessel 204, a nozzle assembly 206 connected to an aft end 204*b* of the pressure vessel 204, and a flight termination system 210 on or over the pressure vessel 204 (e.g., on or over the skirt 202, on each of the pressure vessel 204 and the skirt 202, etc.). The flight termination system 210 may include at least one first shaped charge 211 and at least one second shaped charge 212. The first shaped charge 211 may be configured and positioned to produce a cutting jet that penetrates (e.g., cuts) through the pressure vessel 204 and the solid propellant structure 208 to ignite an inner portion of the solid propellant structure 208 (e.g., at least a portion of the solid propellant structure 208 radially adjacent to and/or exposed by one or more of a bore 216 and slots 224), as described in further detail below. The second shaped charge 212 may be configured and positioned to further damage (e.g., further cut) at least the pressure vessel 204, as also described in further detail below. The solid rocket motor 200 may also include various other structures and/or devices (e.g., insulation structures, ignitor assemblies, etc.) known in the solid rocket motor art.

The configurations of the skirt 202, the pressure vessel 204, and the solid propellant structure 208 may be at least partially different than the configurations of the skirt 102, the pressure vessel 104, and the solid propellant structure 108 previously described in relation to FIGS. 1A and 1B, respectively. For example, as shown in FIGS. 2A and 2B the skirt 202, the pressure vessel 204, and the solid propellant structure 208 may exhibit different dimensions (e.g., different lengths, such as smaller lengths) than the skirt 102, the pressure vessel 104, and the solid propellant structure 108 previously described in relation to FIGS. 1A and 1B, respectively. Other properties (e.g., shapes, sizes, material compositions, orientations, components, component arrangements, etc.) of the skirt 202, the pressure vessel 204, and the solid propellant structure 208 may be substantially similar to or may be different than corresponding properties of the skirt 102, the pressure vessel 104, and the solid propellant structure 108, respectively. Suitable configurations for the skirt 202, the pressure vessel 204, and the solid propellant structure 208 that differ in some way (e.g., exhibit one or more of different shapes, different sizes, different material compositions, different orientations, different components, different component arrangement, etc.) from those of the skirt 102, the pressure vessel 104, and the solid propellant structure 108 are well known in the solid rocket motor art and, therefore, are not described in detail herein. In some embodiments, the skirt 202 exhibits a substantially hollow and elongated shape about 12 feet in diameter and about 13.2 feet in length; the pressure vessel 204 exhibits a generally tubular, dome ended shape having a wall thickness within a range of from about one (1) inch to about two (2) inches, is formed of and includes a graphite epoxy, and has a MEOP of about 1785 psi; and the solid propellant structure 208 is formed of and includes greater than or equal to about 100,000 pounds of class 1.3 solid propellant.

As shown in FIGS. 2A and 2B, the configurations of the bore 216 and the slots 224 may also be at least partially different than the configurations of the bore 116 and the slots 124 previously described in relation to FIGS. 1A and 1B, respectively. For example, as shown in FIGS. 2A and 2B the bore 216 and the slots 224 may exhibit different dimensions (e.g., smaller dimensions) than the bore 116 and the slots 124 previously described in relation to FIGS. 1A and 1B, respectively. In addition, as depicted in FIG. 2B, unlike the slots 124 (FIG. 1B) (e.g., including the major slots 126 and the minor slots 128), the dimensions of the slots 224 may be substantially uniform. As a result of the configurations of the various components (e.g., the skirt 202, the pressure vessel 204, the solid propellant structure 208, the bore 216, the slots 224, etc.) of the solid rocket motor 200, the positions of radial ends 234 of the slots 224 relative to at least the pressure vessel 204 may also be different than the positions of the radial ends 134 (FIGS. 1A and 1B) of the slots 124 (FIGS. 1A and 1B) relative to at least the pressure vessel 104 (FIGS. 1A and 1B). For example, as shown in FIG. 2A, the radial ends 234 of the slots 224 may be positioned proximate a dome-shaped aft end 204b of the pressure vessel 204 but not a tubular sidewall 204c of the pressure vessel 204. Put another way, unlike the position of the major radial ends 136 (FIGS. 1A and 1B) of the major slots 126 (FIGS. 1A and 1B) proximate the tubular sidewall 104c of the pressure vessel 104, the radial ends 234 of the slots 224 may be positioned distal from the tubular sidewall 204c of the pressure vessel 204. As described in further detail below, the positions of the radial ends 234 of the slots 224 may effectuate changes in the configuration of the flight termination system 210 as compared to the configuration of the flight termination system 110 previously described with respect to FIGS. 1A and 1B. Other properties (e.g., shapes, sizes, positions, orientations, numbers, etc.) of the bore 216 and the slots 224 may be substantially similar to or may be different than corresponding properties of the bore 116 and the slots 124, respectively. Suitable configurations for the bore 216 and the slots 224 that differ in some way (e.g., exhibit one or more of different shapes, different sizes, different positions, different numbers, etc.) from those of the bore 116 and the slots 124 are well known in the solid rocket motor art and, therefore, are not described in detail herein. In some embodiments, a thickness of a portion of the solid propellant structure 208 intervening between the pressure vessel 204 and the bore 216 is about fifty-four (54) inches, and a thickness of other portions of the solid propellant structure 208 intervening between the pressure vessel 204 and the radial ends 234 of the slots 224 is about six (6) inches. In additional embodiments, one or more of the bore 216 and the slots 224 may be absent (e.g., omitted) from the solid propellant structure 208.

The flight termination system 210 may be configured and positioned to ignite and pressurize the solid rocket motor 200 while also reducing the ability of the solid rocket motor 200 to withstand a change increase) in internal pressure. For example, the flight termination system 210 may be configured and positioned to cut through portions of the pressure vessel 204 and the solid propellant structure 208 and ignite at least an inner portion of the solid propellant structure 208 (e.g., at least a portion of the solid propellant structure 208 radially adjacent to and/or exposed by one or more of the bore 216 and the slots 224) using the at least one first shaped charge 211 so as to pressurize the solid rocket motor 200, and may also be configured and operated to cut at least partially through one or more other portions of the pressure vessel 204 using the at least one second shaped charge 212 to weaken the pressure vessel 204. Pressurizing the solid rocket motor 200 using the first shaped charge 211 while also damaging the pressure vessel 204 using the second shaped charge 212 may cause the pressure vessel 204 to fail prior to reaching to a standard ignition pressure of the solid rocket motor 200. The failed pressure vessel 204 may be unable to support the ignited solid propellant structure 208, causing the failed pressure vessel 204 and the ignited solid propellant structure 208 to break into smaller pieces presenting substantially reduced safety concerns (e.g., earthen-impact-based overpressure concerns, such near-field blast overpressure concerns and distance focused overpressure concerns). Similar to the flight termination system 110 previously described with respect to FIGS. 1A and 1B, the flight termination system 210 advantageously utilizes energy produced by the solid propellant structure 208 upon ignition to assist with the destruction of the solid rocket motor 200. Utilizing the energy produced by the solid propellant structure 208 may reduce the amount of ordnance (e.g., shaped charges) required to safely break up the solid rocket motor 200 using the flight termination system 210 as compared to conventional flight termination systems that only utilize the energy produced by the ordnance (e.g., shaped charges) thereof to break up a conventional solid rocket motor.

The first shaped charge 211 of the flight termination system 210 may comprise at least one shaped charge (e.g., at least one conical shaped charge, at least one linear shaped charge, combinations thereof, etc.) configured and positioned to effectuate the ignition of an inner portion of the solid propellant structure 208. In some embodiments, the first shaped charge 211 comprises a conical shaped charge. In additional embodiments, the first shaped charge 211 comprises a linear shaped charge. As described in further detail below, the properties (e.g., dimensions, material composition, strength, orientation, position, etc.) of the first shaped charge 211 may be selected (e.g., tailored) relative to the configurations (e.g., shapes, sizes, material compositions, arrangements, etc.) of the other components (e.g., the second shaped charge 212, the skirt 202, the pressure vessel 204, the solid propellant structure 208, the slots 224 within the solid propellant structure 208, the bore 216 extending through the solid propellant structure 208, etc.) to ensure desired destruction of the solid rocket motor 200 using the flight termination system 210.

The first shaped charge 211 may be positioned at one or more locations over the pressure vessel 204 of the solid rocket motor 200 permitting a cutting jet subsequently produced upon initiation of the first shaped charge 211 to cut through underlying portions of the pressure vessel 204 and the solid propellant structure 208 and ignite an inner portion of the solid propellant structure 208. The position of the first shaped charge 211 may be selected at least partially based on the configurations and positions of the other components of the solid rocket motor 200. At least a portion of the first shaped charge 211 may be positioned over a portion of the solid propellant structure 208 at a location exhibiting a relatively smaller thickness of solid propellant so as to minimize the amount of solid propellant the subsequently produced cutting jet has to cut through to access the bore 216 and ignite the solid propellant structure 208. By way of non-limiting example, as shown in FIGS. 2A and 2B, in embodiments wherein the radial ends 234 of one or more of the slots 224 within the solid propellant structure 208 are positioned proximate the dome-shaped aft end 204b of the pressure vessel 204, at least a portion of the first shaped charge 211 may be positioned over one or more of the radial ends 234 of the slots 224 such that a cutting jet subsequently produced by the second shaped charge 212 cuts through the pressure vessel 204 and a portion of the solid propellant intervening between the pressure vessel 204 and the radial ends 234 of the slots 224 (e.g., rather than the solid propellant intervening between the tubular sidewall 204c of the pressure vessel 204 and the bore 216) to access and ignite the solid propellant structure 208 at the bore 216. The first shaped charge 211 may be substantially limited (e.g., confined) to one or more positions overlying and aligned with one or more of the radial ends 234 of the slots 224, or may extend across and/or to one or more positions not overlying and/or not aligned with the radial ends 234 of the slots 224. In some embodiments, the first shaped charge 211 is substantially limited to one or more positions on the dome-shaped aft end 204b of the pressure vessel 204 overlying and aligned with one or more of the radial ends 234 of the slots 224.

The first shaped charge 211 may exhibit any cutting strength (e.g., detonation rate and explosive load) permitting the cutting jet produced upon initiation of the first shaped charge 211 to ignite an inner portion of the solid propellant structure 208. The cutting strength of the first shaped charge 211 may be selected at least partially based on the configurations and positions of the other components of the solid rocket motor 200. By way of non-limiting example, a detonation rate of the first shaped charge 211 may be greater than or equal to about 6,500 meters per second (m/s) (e.g., greater than or equal to about 7,000 m/s, greater than or equal to about 7,500 m/s, greater than or equal to about 8,000 m/s, greater than or equal to about 8,500 m/s, greater than or equal to about 9,000 m/s, etc.), and an explosive load of the first shaped charge 211 may be greater than or equal to about 400 grains/ft (e.g., greater than or equal to about 600 grains/ft, greater than or equal to about 1,200 grains/ft, greater than or equal to about 2,000 grains/ft, greater than or equal to about 3,200 grains/ft, greater than or equal to about 4,000 grains/ft, greater than or equal to about 10,000 grains/ft, etc.).

While FIGS. 2A and 2B depict the flight termination system 210 as being formed of and including a single first shaped charge 211 (i.e., only one first shaped charge 211), the flight termination system 210 may, alternatively, be formed of and include a plurality of first shaped charges 211 (i.e., multiple first shaped charges 211). The flight termination system 210 may include any quantity and any distribution of the first shaped charges 211 facilitating the ignition of an inner portion of the solid propellant structure 208. The quantity and the distribution of the first shaped charge(s) 211 may be selected at least partially based on the configurations and positions of the other components of the solid rocket motor 200. The flight termination system 210 may, for example, employ multiple first shaped charges 211 to provide redundant means of igniting the solid propellant structure 208. If the flight termination system 210 includes a plurality of the first shaped charges 211, the first shaped charges 211 may be symmetrically distributed over the pressure vessel 204 of the solid rocket motor 200, or may be asymmetrically distributed over the pressure vessel 204 of the solid rocket motor 200. In addition, if the flight termination system 210 includes a plurality of the first shaped charges 211, each of the first shaped charges 211 may be substantially the same (e.g., exhibit substantially the same dimensions, shape, material composition, orientation, etc.), or at least one of the first shaped charges 211 may be different than (e.g., exhibit one or more of different dimensions, a different shape, a different material composition, a different orientation, etc.) than at least one other of the first shaped charges 211.

With continued reference to FIGS. 2A and 2B, the second shaped charge 212 of the flight termination system 210 may comprise at least one shaped charge (e.g., at least one linear shaped charge) configured and positioned to effectuate additional damage to at least the pressure vessel 204 (e.g., portions of the pressure vessel 204 not covered by the first shaped charge 211). As shown in FIG. 2A, in some embodiments, the second shaped charge 212 comprises a linear shaped charge include a casing 230, an explosive material 232 within the casing 230, and a concave (e.g., V-shaped) liner 233 within the casing 230 and backed by the explosive material 232. As described in further detail below, the properties (e.g., size, material composition, strength, and orientation, relative arrangement, etc.) of the second shaped charge 212 may be selected (e.g., tailored) relative to the configurations (e.g., shapes, sizes, material compositions, arrangements, etc.) of the other components (e.g., the first shaped charge 211, the skirt 202, the pressure vessel 204, the solid propellant structure 208; the slots 224 within the solid propellant structure 208, the bore 216 extending through the solid propellant structure 208, etc.) to ensure desired destruction of the solid rocket motor 200 using the flight termination system 210.

The second shaped charge 212 may be positioned at one or more locations over the pressure vessel 204 (e.g., on the skirt 202) of the solid rocket motor 200 permitting a cutting jet subsequently produced by the second shaped charge 212 to at least partially cut through underlying portions of the pressure vessel 204. The position of the second shaped charge 212 may be selected at least partially based on the configurations and positions of the other components of the solid rocket motor 200. The second shaped charge 212 may be spaced apart (e.g., separated, discrete, etc.) from the first shaped charge 211. By way of non-limiting example, as shown in FIGS. 2A and 2B, the second shaped charge 212 may be positioned on or over one or more portions of tubular sidewall 204c of the pressure vessel 204 discrete from the position of the first shaped charge 211. The separation between the first shaped charge 211 and the second shaped charge 212 may control venting of the solid rocket motor 200 upon the ignition the solid propellant structure 208 using the first shaped charge 211 to ensure that the solid rocket motor 200 becomes sufficiently pressurized to facilitate desired breakup of the solid propellant structure 208 and the pressure vessel 204.

The second shaped charge 212 may extend in one or more of a substantially linear path and substantially non-linear path (e.g., a curved path, an angled path, a jagged path, a sinusoidal path, a V-shaped path, an U-shaped path, an irregularly shaped path, combinations thereof, etc.) over the pressure vessel 204. The pathing of the second shaped charge 212 may be selected at least partially based on the configurations and positions of the other components of the solid rocket motor 200. In some embodiments, the second shaped charge 212 extends in a substantially linear path over at least the tubular sidewall 204c of the pressure vessel 204. In additional embodiments, the second shaped charge 212 extends in a substantially non-linear path over at least the tubular sidewall 204c of the pressure vessel 204.

The second shaped charge 212 may be provided in any orientation relative to a central longitudinal axis 201 of the solid rocket motor 200 permitting the second shaped charge 212 to sufficiently damage the pressure vessel 204 to facilitate desired breakup of the solid rocket motor 200. The orientation of the second shaped charge 212 may be selected at least partially based on the configurations and positions of the other components of the solid rocket motor 200. In some embodiments, the second shaped charge 212 is oriented substantially perpendicular to the central longitudinal axis 201 of the solid rocket motor 200. For example, as shown in FIGS. 2A and 2B, the second shaped charge 212 may circumferentially extend over and across and at least a portion of the tubular sidewall 204c of the pressure vessel 204. In additional embodiments, the second shaped charge 212 is oriented non-perpendicular (e.g., parallel, diagonal, etc.) to the central longitudinal axis 201 of the solid rocket motor 200.

The second shaped charge 212 may exhibit any dimensions (e.g., length, width, height) and cutting strength (e.g., detonation rate and explosive load) permitting the second shaped charge 212, in combination with pressurization of the solid rocket motor 200 effectuated by the first shaped charge 211, to sufficiently damage the pressure vessel 204 to facilitate desired breakup of the solid rocket motor 200. The dimensions and the cutting strength of the second shaped charge 212 may be selected at least partially based on the configurations and positions of the other components of the solid rocket motor 200. As a non-limiting example, the second shaped charge 212 may exhibit a length less than or equal to about seventy-five (75) percent (e.g., less than or equal to about fifty (50) percent, less than or equal to about twenty-five (25) percent, less than or equal to about fifteen (15) percent, less than or equal to about ten (10) percent, less than or equal to about five (5) percent, etc.) of the length of the skirt 202, a detonation rate greater than or equal to about 6,500 meters per second (m/s) (e.g., greater than or equal to about 7,000 m/s, greater than or equal to about 7,500 m/s, greater than or equal to about 8,000 m/s, greater than or equal to about 8,500 m/s, greater than or equal to about 9,000 m/s, etc.), and an explosive load greater than or equal to about 400 grains per foot (grains/ft) (e.g., greater than or equal to about 600 grains/ft, greater than or equal to about 1,200 grains/ft, greater than or equal to about 2,000 grains/ft, greater than or equal to about 3,200 grains/ft, greater than or equal to about 4,000 grains/ft, etc.). In some embodiments, the second shaped charge 212 has a length of about four (4) ft, a detonation rate greater than or equal to about 8,200 m/s, and an explosive load of about 2,000 grains/ft.

The flight termination system 210 may include any quantity and any distribution of second shaped charges 212 that, in combination with pressurization of the solid rocket motor 200 effectuated by the first shaped charge 211, facilitates sufficient to damage the pressure vessel 204 for desired breakup of the solid rocket motor 200. The quantity and the distribution of the second shaped charge(s) 212 may be selected at least partially based on the configurations and positions of the other components of the solid rocket motor 200. In some embodiments, the flight termination system 210 includes a plurality (e.g., at least two) of the second shaped charges 212. For example, as shown in FIGS. 2A and 2B, multiple second shaped charges 212 may be provided in opposing positions (e.g., opposing circumferential positions) over the pressure vessel 204. Multiple second shaped charges 212 may provide redundant means of damaging the pressure vessel 204 and/or may increase one or more of the amount and the distribution of damage to the pressure vessel 204. If the flight termination system 210 includes a plurality of the second shaped charges 212, the second shaped charges 212 may be symmetrically distributed over the pressure vessel 204 of the solid rocket motor 200, or may be asymmetrically distributed over the pressure vessel 204 of the solid rocket motor 200. In addition, if the flight termination system 210 includes a plurality of the second shaped charges 212, each of the second shaped charges 212 may be substantially the same (e.g., exhibit substantially the same size, shape, material composition, and orientation), or at least one of the second shaped charges 212 may be different than (e.g., exhibit one or more of a different size, a different shape, a different material composition, and a different orientation) than at least one other of the second shaped charges 212. While FIGS. 2A and 2B depict the flight termination system 210 as being formed of and including a plurality of second shaped charges 212 (i.e., multiple second shaped charges 212), the flight termination system 210 may, alternatively, be formed of and include a single second shaped charge 212 (i.e., only one second shaped charge 212).

Figure 3:
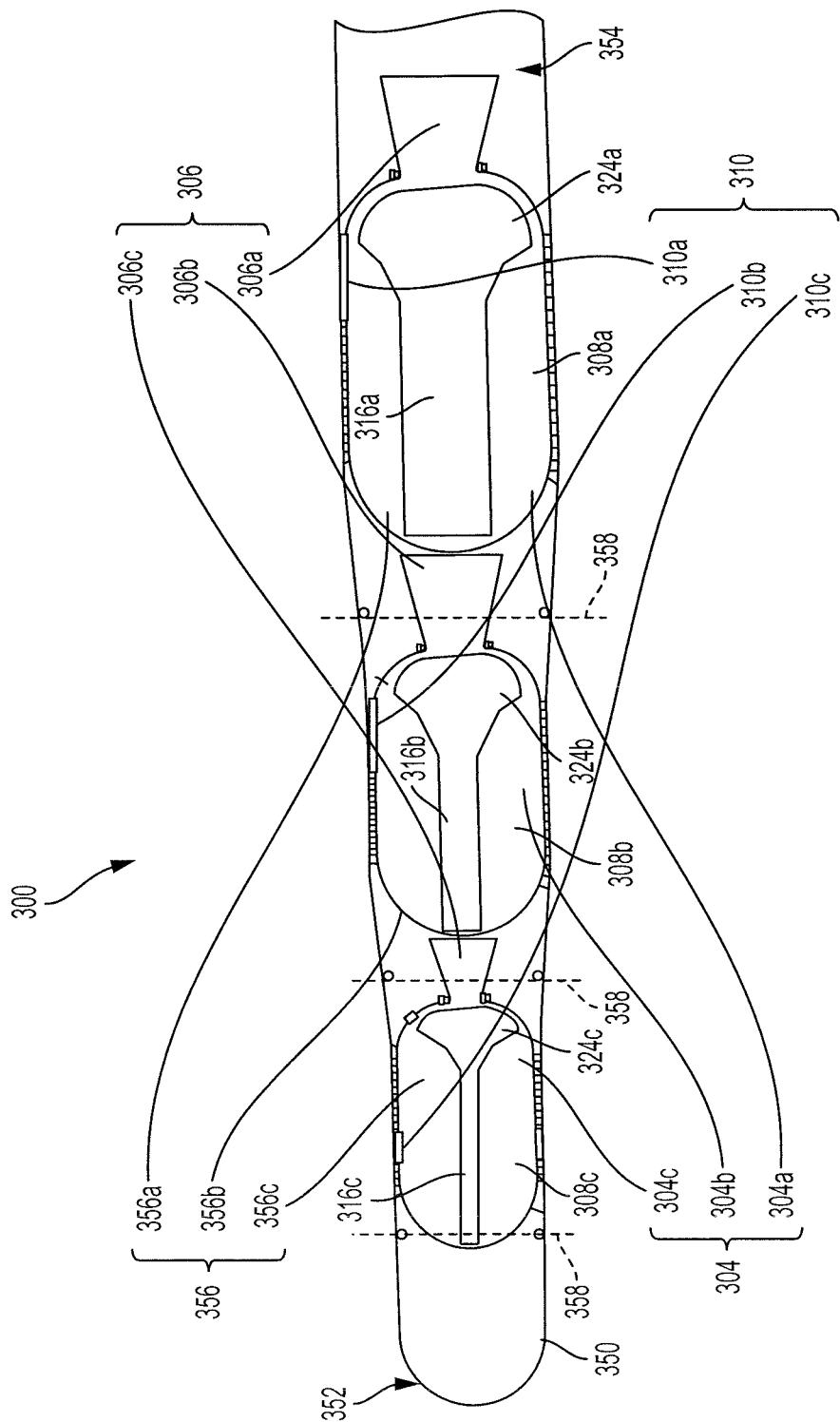
FIG. 3 is a schematic longitudinal, cross-sectional view of a multi-stage rocket motor assembly, in accordance with embodiments of the disclosure.

FIG. 3 is a schematic longitudinal cross-sectional view of a multi-stage rocket motor assembly 300, in accordance with an embodiment of the disclosure. The multi-stage rocket motor assembly 300 may include an outer housing 350 having a closed forward end 352 and an open aft end 354. The outer housing 350 may comprise a single, substantially monolithic structure, or may comprise a plurality of connected (e.g., attached, coupled, bonded, etc.) structures. As used herein, the term "monolithic structure" means and includes a structure formed as, and comprising a single, unitary structure of a material. The multi-stage rocket motor assembly 300 also includes plurality of stages 356 provided in an end-to-end relationship with one another within the outer housing 350. By way of non-limiting example, the plurality of stages 356 may include a first stage 356a, a second stage 356b, and a third stage 356c each contained within the outer housing 350. In additional embodiments, the multi-stage rocket motor assembly 300 may include a different number of stages 356, such as from one (1) stage to ten (10) stages. In addition, the outer housing 350 may be configured to be severable at locations 358 associated with the stages 356 during use and operation of the multi-stage rocket motor assembly 300.

As shown in FIG. 3, the stages 356 of the multi-stage rocket motor assembly 300 may include pressure vessels 304 (e.g., a first pressure vessel 304a, a second pressure vessel 304b, and a third pressure vessel 304c), nozzle assemblies 306 (e.g., a first nozzle assembly 306a, a second nozzle assembly 306b, and a third nozzle assembly 306c) connected to aft ends of the pressure vessels 304, solid propellant structures 308 (e.g., a first solid propellant structure 308a, a second solid propellant structure 308b, and a third solid propellant structure 308c) contained within the pressure vessels 304, bores 316 (e.g., a first bore 316a, a second bore 316b, and a third bore 316c) and slots 324 (e.g., first slots 324a, second slots 324b, and third slots 324c) within the solid propellant structures 308, and flight termination systems 310 (e.g., a first flight termination system 310a, a second flight termination system 310b, and a third flight termination system 310c) on or over the pressure vessels 304. One or more of the stages 356 of the multi-stage rocket motor assembly 300 may independently be substantially similar to the solid rocket motor 100 (FIGS. 1A and 1B) and/or the solid rocket motor 200 (FIGS. 2A and 2B) previously described herein. As a non-limiting example, the configuration of second stage 356b (e.g., including the configuration of each of the second pressure vessel 304b, the second nozzle assembly 306b, the second solid propellant structure 308b, the second bore 316b, the second slots 324b, and the second flight termination system 310b) may be substantially similar to the configuration of the solid rocket motor 100 (e.g., including the configuration of each of the pressure vessel 104, the nozzle assembly 106, the solid propellant structure 108, the bore 116, the slots 124, and the flight termination system 110) previously described herein with respect to FIGS. 1A and 1B. As another non-limiting example, the configuration of third stage 356c (e.g., including the configuration of each of the third pressure vessel 304c, the third nozzle assembly 306c, the third solid propellant structure 308c, the third bore 316c, the third slots 324c, and the third flight termination system 310c) may be substantially similar to the solid rocket motor 200 (e.g., including the configuration of each of the pressure vessel 204, the nozzle assembly 206, the solid propellant structure 208, the bore 216, the slots 224, and the flight termination system 210) previously described herein with respect to FIGS. 2A and 2B. In additional embodiments, one or more of the stages 356 may independently exhibit a different solid rocket motor configuration, such as configuration free of one or more of the bore 316 and the slots 324 within the solid propellant structure 308 thereof. In further embodiments, the multi-stage rocket motor assembly 300 may include at least one additional stage exhibiting a liquid rocket motor configuration. Suitable liquid rocket motor configurations are well known in the rocket motor art, and, therefore, are not described in detail herein.

In use and operation, a solid rocket motor (e.g., the solid rocket motor 100 shown in FIGS. 1A and 1B, the solid rocket motor 200 shown in FIGS. 2A and 2B, etc.) and/or a multi-stage rocket motor assembly (e.g., the multi-stage rocket motor assembly 300 shown in FIG. 3) according to embodiments of the disclosure may be provided as a component of a launch vehicle (e.g., a missile assembly, a rocket assembly, etc.). If, during the flight of the launch vehicle it is deemed necessary to prematurely terminate the flight of the launch vehicle (e.g., destroy the launch vehicle), at least one flight termination system (e.g., the flight termination system 110 shown in FIGS. 1A and 1B, the flight termination system 210 shown in FIGS. 2A and 2B, one or more of the flight termination systems 310 shown in FIG. 3, etc.) of the solid rocket motor and/or the multi-stage rocket motor assembly of the launch vehicle may be initiated (e.g., activated) to ignite and pressurize the solid rocket motor and/or one or more unpressurized stages (e.g., the second stage 356b and/or the third stage 356c shown in FIG. 3) of the multi-stage rocket motor assembly and also damage (e.g., cut) at least one pressure vessel thereof (e.g., the pressure vessel 104 shown in FIGS. 1A and 1B, the pressure vessel 204 shown in FIGS. 2A and 2B, one or more of the second pressure vessel 304b and the third pressure vessel 304c shown in FIG. 3, etc.). The combination of pressurizing the solid rocket motor and/or the one or more unpressurized stages of the multi-stage rocket motor assembly and damaging (e.g., weakening) the pressure vessel(s) thereof results in the controlled breakup of solid propellant structures (e.g., one or more of the solid propellant structures 108, 208, and 308 shown in FIGS. 1A through 3) of the solid rocket motor and/or the multi-stage rocket motor assembly into pieces that produce reduced near-field blast overpressure and distance focused overpressure upon impact with the another structure (e.g., an earthen formation). Without being bound to a particular theory, it is believed that pressuring the solid rocket motor and/or the one or more unpressurized stage(s) of the multi-stage rocket motor assembly transfers pressure to the weakened pressure vessel(s), resulting in further damage to and weakening of the weakened pressure vessel(s). As the further weakened pressure vessel(s) fails (e.g., breaks apart), the pressure load is directed to the solid propellant structure(s) of the solid rocket motor and/or the multi-stage rocket motor assembly stage(s), resulting in radial expansion of the solid propellant structure(s) and shear failure between the pressure vessel(s) and the solid propellant structure(s). Thereafter, decreasing pressure and residual stresses effectuate the breakup of the solid propellant structure(s) into multiple smaller pieces (e.g., chunks) each having less than about 40,000 pounds (lbs) of solid propellant according to the configuration(s) (e.g., dimensions, shape(s), material composition(s), etc.) of the solid propellant structure(s).

Embodiments of the disclosure may be used to provide virtually infinite flexibility to tailor destruction of an unpressurized solid rocket motor to the particular configuration of the solid rocket motor so as to effectuate breakup (e.g., fragmentation) of one or more solid propellant structures of the unpressurized solid rocket motor into discrete, smaller pieces each having a weight less than about 40,000 lbs. For example, the configurations of the flight termination systems of the disclosure (e.g., the flight termination systems 110, 210, 310 shown in FIGS. 1A through 3), including the configurations and positions of the various components thereof (e.g., shaped charges, such as the shaped charges 112, 211, 212 shown in FIGS. 1A through 2B; conditioning structures, such as the conditioning structure 114 shown in FIGS. 1A and 1B), may be tailored to the configurations of various other components (e.g., pressure vessels, such as the pressure vessels 104, 204, 304 shown in FIGS. 1A through 3; solid propellant structures, such as the solid propellant structures 108, 208, 308 shown in FIGS. 1A through 3; bores, such as the bores 116, 216, 316 shown in FIGS. 1A through 3; slots, such as the slots 124, 224, 324 shown in FIGS. 1A through 3; etc.) of solid rocket motors including the flight termination systems to facilitate sufficient destruction of the solid rocket motors to use a launch vehicle including the solid rocket motors near populated areas. The flight termination systems, solid rocket motors, rocket motor assemblies, and methods of the disclosure may increase destruction efficiency, reduce costs, increase payloads, and increase safety as compared to conventional flight termination systems, conventional solid rocket motors, conventional rocket motor assemblies, and conventional methods.

While the disclosure is susceptible to various modifications and alternative forms, specific embodiments have been shown by way of example in the drawings and have been described in detail herein. However, the disclosure is not limited to the particular forms disclosed. Rather, the disclosure encompasses all modifications, equivalents, and alternatives falling within the scope of the disclosure as defined by the following appended claims and their legal equivalents.

What is claimed is:

1. A solid rocket motor, comprising:
a pressure vessel;
a solid propellant structure within the pressure vessel;
a bore longitudinally extending through the solid propellant structure;
a slot in communication with an end of the bore and exhibiting a radial end proximate a sidewall of the pressure vessel, the radial end of the slot longitudinally extending across less than an entirety of the bore, and an outer boundary of the slot tapering toward the bore from the radial end of the slot; and
a flight termination system overlying the pressure vessel and comprising a shaped charge positioned over and laterally aligned with the radial end of the slot and configured to effectuate ignition of an inner portion of the solid propellant structure at the bore and a reduction in an ability of the pressure vessel to withstand a change in internal pressure.

2. The solid rocket motor of claim 1, wherein the shaped charge is configured and positioned to cut through portions of the pressure vessel and the solid propellant structure overlying the radial end of the slot and to at least partially cut through additional portions of the pressure vessel laterally aligned with but longitudinally offset from radial end of the slot.

3. The solid rocket motor of claim 1, wherein the shaped charge comprises a linear shaped charge.

4. The solid rocket motor of claim 3, wherein the flight termination system further comprises a conditioning structure configured to reduce damage to the pressure vessel effectuated by the linear shaped charge, the conditioning structure separate from and only partially interposed between the linear shaped charge and an external surface of the pressure vessel across longitudinal dimensions of the linear shaped charge and the pressure vessel.

5. The solid rocket motor of claim 4, wherein the conditioning structure comprises at least one material positioned between a portion of the linear shaped charge and an underlying portion of the pressure vessel, the material longitudinally extending across less than an entirety of the linear shaped charge.

6. The solid rocket motor of claim 1, wherein an entirety of the shaped charge is positioned over the sidewall of the pressure vessel.

7. The solid rocket motor of claim 1, wherein the shaped charge is oriented parallel to a central longitudinal axis of the solid rocket motor.

8. A solid rocket motor, comprising:
a skirt structure;
a pressure vessel discrete from and contained within the skirt structure;
a nozzle assembly connected to the skirt structure and an aft end of the pressure vessel;
a solid propellant structure within the pressure vessel;
a bore longitudinally extending through the solid propellant structure;
a slot in communication with an aft end of the bore and exhibiting a radial end longitudinally proximate an aft end of the pressure vessel, the slot outwardly tapering from a location along the bore more longitudinally distal from the aft end of the pressure vessel to the radial end thereof; and
a flight termination system comprising:
a first shaped charge overlying one or more of the skirt structure and the pressure vessel, the first shaped charge positioned over and laterally aligned with the radial end of the slot and configured to effectuate ignition of the solid propellant structure at the aft end of the bore; and
a second shaped charge overlying the skirt structure and spaced apart from the first shaped charge, the second shaped charge configured and positioned to effectuate a reduction in an ability of the pressure vessel to withstand a change in internal pressure.

9. The solid rocket motor of claim 8, wherein:
the first shaped charge is configured and positioned to cut through portions of the pressure vessel and the solid propellant structure overlying the radial end of the slot; and
the second shaped charge is configured and positioned to cut through portions of the skirt structure and additional portions of the pressure vessel not overlying the radial end of the slot.

10. The solid rocket motor of claim 8, wherein:
the first shaped charge is located over the aft end of the pressure vessel at a position aligned with the radial end of the slot; and
the second shaped charge is located over a tubular sidewall of the skirt structure.

11. The solid rocket motor of claim 8, wherein:
the first shaped charge comprises a conical shaped charge; and
the second shaped charge comprises a linear shaped charge.

12. The solid rocket motor of claim 8, wherein the second shaped charge is oriented perpendicular to a central longitudinal axis of the solid rocket motor.

13. The solid rocket motor of claim 8, further comprising a third shaped charge at another position over the skirt structure opposing a position of the second shaped charge.

14. A multi-stage rocket motor assembly, comprising:
an outer housing; and
a plurality of stages in a stacked arrangement within the outer housing, at least one stage of the plurality of stages comprising:
a pressure vessel;
a solid propellant structure within the pressure vessel;
a bore longitudinally extending through the solid propellant structure;
a slot in communication with an end of the bore and exhibiting a radial end proximate a sidewall of the pressure vessel, the radial end of the slot longitudinally extending across less than an entirety of the bore, and an outer boundary of the slot tapering toward the bore from the radial end of the slot; and
a flight termination system overlying the pressure vessel and comprising at least one shaped charge positioned over and aligned with the radial end of the slot and configured to effectuate ignition of an inner portion of the solid propellant structure at the bore and a reduction in an ability of the pressure vessel to withstand a change in internal pressure.

15. The multi-stage rocket motor assembly of claim 14, wherein the at least one shaped charge is configured and positioned to cut through portions of the pressure vessel and the solid propellant structure overlying the radial end of the slot and to at least partially cut through additional portions of at least the pressure vessel not overlying the radial end of the slot.

16. The multi-stage rocket motor assembly of claim 14, wherein the at least one shaped charge comprises:
at least one conical shaped charge positioned at an aft end of the pressure vessel and overlying the radial end of the slot; and
at least one linear shaped charge discrete from the at least one conical shaped charge and overlying the sidewall of the pressure vessel.

17. The multi-stage rocket motor assembly of claim 14, wherein the at least one shaped charge comprises a linear shaped charge positioned over the sidewall of the pressure vessel.

18. The multi-stage rocket motor assembly of claim 17, wherein the flight termination system further comprises a conditioning structure separate from and only partially interposed between the linear shaped charge and the sidewall of the pressure vessel across longitudinal dimensions of the linear shaped charge and the pressure vessel.

19. The multi-stage rocket motor assembly of claim 14, wherein at least one other stage of the plurality of stages comprises:
another pressure vessel;
another solid propellant structure within the another pressure vessel; and
an additional flight termination system overlying the another pressure vessel and comprising at least one additional shaped charge configured and positioned to effectuate ignition of an inner portion of the another solid propellant structure and a reduction in an ability of the another pressure vessel to withstand a change in internal pressure.

20. The multi-stage rocket motor assembly of claim 19, wherein a configuration of the flight termination system of the at least one stage of the plurality of stages is different than a configuration of the additional flight termination system of the at least one other stage of the plurality of stages.

21. A method of destroying a launch vehicle in flight, comprising:
initiating at least one shaped charge of a flight termination system of a solid rocket motor of the launch vehicle to pressurize the solid rocket motor and weaken a pressure vessel thereof to fragment a solid propellant structure of the solid rocket motor into multiple pieces, the solid rocket motor comprising:
the pressure vessel;
the solid propellant structure within the pressure vessel;
a bore longitudinally extending through the solid propellant structure;
a slot in communication with an end of the bore and exhibiting a radial end proximate a sidewall of the pressure vessel, the radial end of the slot longitudinally extending across less than an entirety of the bore, and an outer boundary of the slot tapering toward the bore from the radial end of the slot; and
the flight termination system overlying the pressure vessel and comprising at least one shaped charge positioned over and laterally aligned with the radial end of the slot and configured to effectuate ignition of an inner portion of the solid propellant structure at the bore and a reduction in an ability of the pressure vessel to withstand a change in internal pressure.

22. The method of claim 21, wherein initiating at least one shaped charge of a flight termination system of a solid rocket motor of the launch vehicle comprises initiating a linear shaped charge at least partially positioned over the radial end of the slot to produce a cutting jet that penetrates through portions of each of the pressure vessel and the solid propellant structure thereunder to ignite an inner portion of the solid propellant structure in communication with the slot and that also damages additional portions of the pressure vessel thereunder.

23. The method of claim 21, wherein initiating at least one shaped charge of a flight termination system of a solid rocket motor of the launch vehicle comprises:
initiating a conical shaped charge positioned at an aft end of the pressure vessel and at least partially over the radial end of the slot to produce a cutting jet that penetrates through portions of the pressure vessel and the solid propellant structure thereunder to ignite an inner portion of the solid propellant structure in communication with the slot; and
initiating a linear shaped charge discrete from the conical shaped charge and overlying the sidewall of the pressure vessel to produce another cutting jet that at least partially penetrates through additional portions of the pressure vessel.

24. The method of claim 21, wherein initiating at least one shaped charge of a flight termination system of a solid rocket motor of the launch vehicle to pressurize the solid rocket motor and weaken a pressure vessel thereof to fragment a solid propellant structure of the solid rocket motor into multiple pieces comprises fragmenting the solid propellant structure having a weight greater than or equal to about 100,000 pounds into pieces each independently having a weight of less than about 40,000 pounds.

* * * * *